United States Patent

Bunia

[11] 4,255,747
[45] Mar. 10, 1981

[54] SUMP PUMP LEVEL WARNING DEVICE

[76] Inventor: Roderick J. Bunia, 1433 Lila, Troy, Mich. 48098

[21] Appl. No.: 960,879

[22] Filed: Nov. 15, 1978

[51] Int. Cl.³ .............................................. G08B 21/00
[52] U.S. Cl. ................................ 340/624; 200/84 R; 340/693; 390/327
[58] Field of Search ............... 340/629, 620, 623, 624, 340/618, 625, 693, 326, 327; 200/84 R, 84 A, 84 B, 84 C; 73/322, 313, 308

[56] References Cited

U.S. PATENT DOCUMENTS

| | | | |
|---|---|---|---|
| 1,288,855 | 12/1918 | Faber | 200/84 R |
| 2,153,421 | 4/1939 | Jessup | 200/84 B |
| 2,905,783 | 9/1959 | Johnson, Jr. | 200/84 R |
| 2,907,994 | 10/1959 | Harke | 340/624 |
| 3,264,627 | 8/1966 | Austin | 340/624 X |
| 3,310,795 | 3/1967 | David | 200/84 R |
| 3,399,399 | 8/1968 | Apfelbaum | 340/620 X |
| 4,126,857 | 11/1978 | Lancia et al. | 340/620 |
| 4,137,527 | 1/1979 | Tennenhouse et al. | 340/620 |

FOREIGN PATENT DOCUMENTS 2205797  8/1972  Fed. Rep. of Germany ........... 340/629

Primary Examiner—John W. Caldwell, Sr.
Assistant Examiner—Daniel Myer
Attorney, Agent, or Firm—Gifford, VanOphem, Sheridan & Sprinkle

[57] ABSTRACT

A battery operated sump well fluid level warning device is provided which is secured to the discharge line extending out of the sump well from a submersible sump pump. A first housing having a battery power source and a float actuated switch disposed therein is secured to the discharge line. A second housing having a light and an audible alarm secured thereto is detachably connected to the first housing by a pair of prongs adapted to be received in a socket on the first housing and thereby provide an electrical connection between the power source and float switch circuit in the first housing and the signal light and audible alarm of the second housing. Alternatively, an extension cord may be used to connect the first housing to the second housing so that the second housing can be remotely positioned from the first housing, thus enabling the warning signals to be better heard and seen.

3 Claims, 3 Drawing Figures

SUMP PUMP LEVEL WARNING DEVICE

BACKGROUND OF THE INVENTION

I. Field of the Invention

The present invention relates generally to sump pump level indicators and more specifically, to such a device having a fully enclosed battery source and a detachable signal unit.

II. Description of the Prior Art

Sump pump fluid level indicators are well known in the prior art. These devices often employ a float switch that operatively closes an electrical circuit to provide an electrical signal. This signal can be used to activate the sump pump or can be used to trigger a signal light or alarm that indicates that the fluid level in the sump well has reached a predetermined level. Quite often these previously-known devices operate on common household electrical current. Therefore, electrical wiring must be extended between an electrical outlet and the indicator device disposed in the sump well. Such a connection is disadvantageous in that the typically high power flowing through the connection is in close proximity to the fluid in the well and can therefore be very dangerous if the wire breaks, wears out or becomes disconnected from its socket on the level indicator.

In addition, the signal light or audible alarm is often enclosed in or secured to the same housing in which the float switch is secured. Thus, a signal light cannot be located in a highly visible area which would avoid the need for the homeowner to periodically check the sump pump in order to determine whether a warning signal is being transmitted. Moreover, when the homeowner is away from home, faulty operation of the sump pump would go undetected by neighbors or passersby who would be able to prevent or warn the owner about possible water damage caused by the overflow of a malfunctioning sump pump.

SUMMARY OF THE INVENTION

The present invention obviates the above-mentioned disadvantages by providing a sump well fluid level signal device having a battery power source fully enclosed within the housing and having a detachably connected alarm unit that includes a light and an audible alarm. The alarm unit can be connected by means of an extension cord to permit the alarm unit to be advantageously positioned in a location remote from the sump. The housing is secured to the discharge line of the sump pump and has a float depending therefrom which operates an electrical switch enclosed within the housing. When the water level rises above a predetermined amount, the float is urged upward and thereby closes the switch. When the switch is closed, the power source within the housing is electrically connected to the light and alarm by appropriate electrical connections to give a visible and audible indication that the sump pump is not working properly.

Although the alarm unit is conveniently attachable to the housing secured to the discharge line, the present invention also provides a portable alarm unit which can be advantageously positioned in a location which is more often viewed or occupied than the sump well.

Thus, the present invention provides a safe, fully-enclosed, power source to prevent shorting out the circuit in the event that the water level within the sump well rises above a predetermined level. In addition, the alarm unit can be advantageously located so that for example, if the homeowner is absent from his home for an extended period, the alarm unit can be placed in a window so that neighbors or passersby will be apprised of a malfunctioning sump and can take appropriate action to prevent damage caused by an overflowing sump.

BRIEF DESCRIPTION OF THE DRAWINGS

The present invention will be more clearly understood by reference to the accompanying drawings wherein like reference characters refer to like parts in the several views and wherein.

DETAILED DESCRIPTION OF THE PRESENT INVENTION

Figure 1:
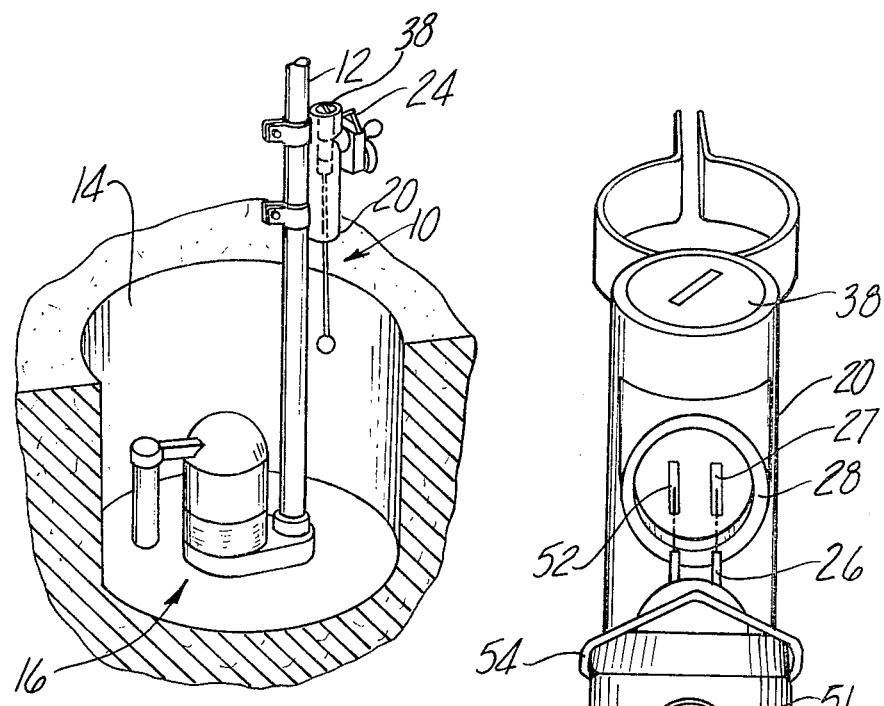
FIG. 1 is a perspective view of the sump level signal device secured to the discharge line of a submersible sump pump.
Figure 2:
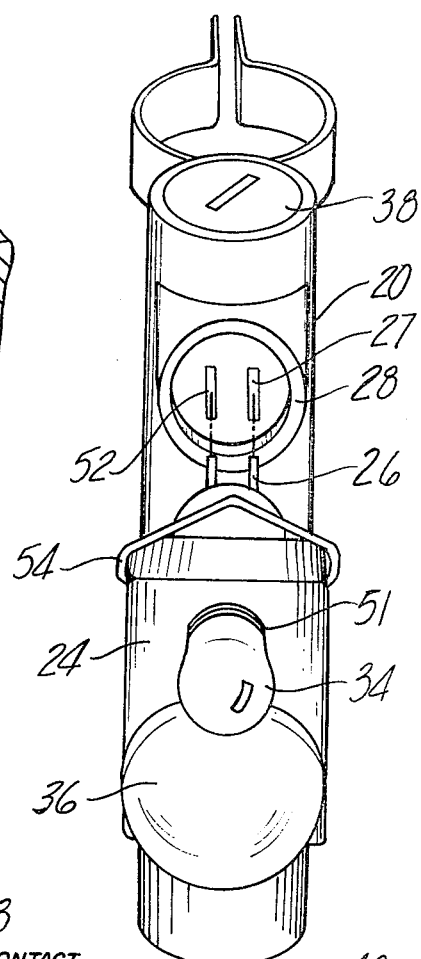
FIG. 2 is an exploded perspective view of the invention.
Figure 3:
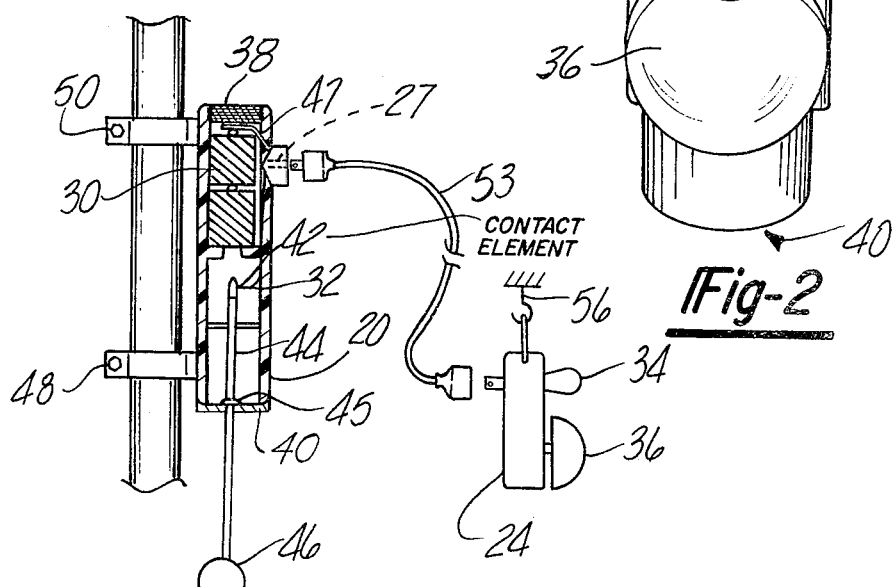
FIG. 3 is a fragmentary side plan view of the device of the present invention showing an alternative alarm unit placement.

Referring now to FIGS. 1 and 2 the fluid level signal device 10 of the present invention is thereshown secured to the discharge line 12 of the submersible pump 16 within the sump well 14. The device 10 comprises a first housing 20 secured by brackets 48 to the discharge line 12 and a second housing 24 adapted to be secured to the housing 20 by a pair of prongs 26 which engage a socket 28 of the first housing 20. Referring now also to FIG. 3, batteries 30 and a float actuated switch 32 are enclosed within the housing 20. A warning light 34 and an audible alarm 36 are secured to the outside of the second housing 24.

The housing 20 as shown in the drawing figures is an elongated tubular housing having a detachable top end member 38 and a bottom end member 40. Preferably, the top end member 38 is an externally threaded cap adapted to engage in an internally threaded portion at the top end of the tube 20 (not shown). The wall of the tubular housing 20 and the ends 38 and 40 cooperate to define a chamber which is adapted to receive a battery power source such as the pair of batteries 30 as shown in FIG. 3. Appropriate electrical contacts, to be hereinafter described, are provided within the chamber to connect the batteries in series with the switch 32 and a pair of electrical contacts in the socket 28.

As shown in FIG. 3, the switch 32 can be of simple construction and comprises a contact element 42 secured to the top of the stem 44 having a float 46 secured at its bottom end. The stem extends through an aperture in the bottom end member 40 of the tubular housing so that the float 46 depends below the lower end 40 of the housing. A retaining ring 45 is secured around the stem 44 to prevent the stem from dropping out of the aperture in end member 40. A contact element 42 secured to the top of stem 44 is electrically wired to one of the contacts 27 in the socket 28. When the water level rises above a predetermined level, the buoyancy of the float 46 urges the contact element 42 into contact with an electrode of the battery 30. The oppositely charged electrode on the battery is electrically connected to the other contact 27 in the socket 28 by a contact member 47 secured to the lower end of the end cap 38.

Preferably, a pair of brackets 48 are secured to the housing 20 by appropriate means such as nut (not shown) and bolt 50. A bolt 50 with a corresponding nut urges both ends of the concave bracket 48 into a tight engagement with the discharge line 12. Thus, the housing 20 is easily and adjustably positioned along the length of the discharge line so that the float 46 is suspended at the desired level. Preferably, the stem 44 is an appropriate length to permit the housing 20 to be secured to the discharge line above the top of the sump well to protect against fluid contact with the electrical elements in the housing, as shown in FIG. 1. Such placement of the housing 20 also permits the alarm unit to be easily checked.

The housing 24 comprises a light socket 50 into which a lightbulb, having an appropriate power rating corresponding with the power of the batteries 30, can be screwed. An audible alram 36 is secured to the outside of the housing 24. Within the housing 24 appropriate electrical wiring connects the light 34 and the alarm 36 in series with the prongs 26. Although this series arrangement may be permanently wired, it may also be desirable to provide a switch across the elements 34 and 36 so that these devices can be operated alternatively or simultaneously.

Each prong 26 is adpated to be received in a slot 52 within the socket 28. Adjacent each slot 52 is a contact element 27 which electrically connects the power source and switch circuit of the housing 20 with the electrical circuit in the housing 24 when the prongs 26 are inserted into the slots 52. Alternatively, the prongs 26 can be inserted into the female end of an extension cord 53 (FIG. 3) while the male end of the cord 53 can be inserted into the socket 28. Thus, the housing 24 can be positioned in a location remote from the sump well in order to make the light 34 more visible or to make the alarm 36 audible in a different area. In such a case, it can be appropriate to provide the housing 24 with a support means such as the bracket 54 as shown in FIG. 2 so that the housing 24 can be suspended by appropriate means such as the hook 56 or the like secured to the ceiling.

Thus, the invention provides an easily positioned and mounted but effective signal device to indicate a malfunctioning of the sump pump. In addition, low power batteries and appropriate electrical elements 34 and 36 avoid the danger commensurate with the possibility of high power household current coming in contact with the water in the sump well. Moreover, the mobility afforded by the extension cord 53 enables the device to be appropriately positioned in a window or the like so that it effectively signals and warns neighboring residents or passersby of possible water flood damage. Thus, appropriate steps may be taken to avoid such damage even when the resident is away for an extended period.

Having thus described my invention, many modifications thereto will become apparent to those skilled in the pertinent art without departing from the spirit of the invention as defined by the scope of the appended claims.

What is claimed is:

1. A sump well fluid level indicator for a sump having a submersible discharge pump at the bottom of the sump well and a fluid discharge line extending upwardly out of the sump well from the pump, comprising:
    a housing secured to the discharge line,
    a float actuated switch disposed within said first housing, said switch including a conductor element secured to the uppermost portion of a nonconducting elongated shaft extending outwardly from the bottom of said first housing and having a buoyant member secured to the lower end of said shaft externally of said housing,
    electric circuit means for conducting electrical power through said switch, including a battery disposed within said first housing directly above said conductor element whereby when said float switch is activated, said conductor element contacts a single terminal of said battery, whereas when said float switch is deactivated, said conductor element is spaced apart from said single battery terminal,
    a second housing,
    an alarm secured to said second housing,
    a signal light secured to said second housing,
    first selectively engageable connector means for detachably connecting said second housing to said first housing, and at the same time electrically connecting said electric circuit means to said alarm and said signal light, whereby when said switch is closed said alarm and signal light are activated,
    second selectively engagable connector means for detachably connecting said second housing to a support structure remotely positioned with respect to said first housing when said first connector means is disengaged, and
    third selectively engagable connector means for electrically connecting said electric circuit means to said alarm and signal light when said first connector means is disengaged,
    wherein said buoyant member remains disposed externally of said first housing when said switch is in its open and closed positions.

2. The invention as described in claim 1 wherein said third connector means comprises an extension cord.

3. The invention as defined in claim 1 wherein said first housing includes a bottom end member having an aperture dimensioned to slidably receive said elongated shaft, and
    wherein said elongated shaft includes an electrically conducting contact member at its upper end and a radially projecting member secured to said shaft intermediate said contact pin and said buoyant member and above said bottom wall of said first housing,
    whereby said contact member remains entrained within said first housing and above the fluid level of said sump well.

* * * * *

UNITED STATES PATENT AND TRADEMARK OFFICE
CERTIFICATE OF CORRECTION

PATENT NO. : 4,255,747
DATED : March 10, 1981
INVENTOR(S) : Roderick J. Bunia

It is certified that error appears in the above-identified patent and that said Letters Patent are hereby corrected as shown below:

Column 4, line 6, before "housing", insert --first--.

Signed and Sealed this

Twenty-sixth Day of May 1981

[SEAL]

Attest:

RENE D. TEGTMEYER

*Attesting Officer*  *Acting Commissioner of Patents and Trademarks*